United States Patent
Shaffer et al.

(10) Patent No.: US 9,420,091 B2
(45) Date of Patent: Aug. 16, 2016

(54) SYSTEM AND METHOD FOR HIGH-QUALITY CALL RECORDING IN A HIGH-AVAILABILITY ENVIRONMENT

(71) Applicant: Avaya Inc., Basking Ridge, NJ (US)

(72) Inventors: Shmuel Shaffer, Palo Alto, CA (US); Oliver Daniels, Galway (IE); Thomas Moran, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 156 days.

(21) Appl. No.: 14/078,671

(22) Filed: Nov. 13, 2013

(65) Prior Publication Data

US 2015/0133092 A1    May 14, 2015

(51) Int. Cl.
*H04M 1/64* (2006.01)
*H04M 3/42* (2006.01)
*H04W 4/16* (2009.01)

(52) U.S. Cl.
CPC ............ *H04M 3/42221* (2013.01); *H04W 4/16* (2013.01)

(58) Field of Classification Search
CPC ............ G06Q 20/341; G06Q 20/3558; G06Q 20/40145; G07F 7/1008
USPC ........................................... 379/88.01–88.19
See application file for complete search history.

(56) References Cited

U.S. PATENT DOCUMENTS

| | | | | |
|---|---|---|---|---|
| 7,450,705 | B1 * | 11/2008 | Cohen | H04M 3/2236 370/260 |
| 8,023,665 | B2 * | 9/2011 | Schwartz | H03G 3/32 333/28 T |
| 8,706,689 | B1 * | 4/2014 | Adam | 707/616 |
| 2004/0022382 | A1 * | 2/2004 | Sweeney et al. | 379/218.01 |
| 2004/0240631 | A1 * | 12/2004 | Broman et al. | 379/88.02 |
| 2010/0017716 | A1 * | 1/2010 | Weda | G11B 27/034 715/719 |
| 2010/0309747 | A1 * | 12/2010 | Mizutani et al. | 367/14 |
| 2011/0299836 | A1 * | 12/2011 | Amsterdam | H04N 5/765 386/295 |
| 2013/0064379 | A1 * | 3/2013 | Pardo et al. | 381/56 |
| 2014/0074471 | A1 * | 3/2014 | Sankar | G10L 17/02 704/246 |
| 2014/0348061 | A1 * | 11/2014 | Salkintzis | H04W 4/008 370/328 |
| 2015/0039304 | A1 * | 2/2015 | Wein | G10L 25/78 704/233 |

* cited by examiner

Primary Examiner — Solomon Bezuayehu
(74) Attorney, Agent, or Firm — Stevens & Showalter LLP

(57) ABSTRACT

System and method to improve quality of a high-availability recording of a media stream, the method including: recording the media stream by at least a first and second recorders at separate network locations, to produce first and second recordings; comparing quality metrics of the first and second recordings; and creating an archival copy of the media stream based upon a comparison of quality metrics. In some embodiments, the method may further include: segmenting the first and second recordings into a respective first and second plurality of coextensive segments; and for substantially each segment of the first plurality of segments: comparing a quality metric of said segment with a quality metric of a corresponding segment from the second plurality of segments; and creating an archival copy of a segment of the media stream based upon a comparison of quality metrics for said segment.

20 Claims, 4 Drawing Sheets

100

200

300

600

700

SYSTEM AND METHOD FOR HIGH-QUALITY CALL RECORDING IN A HIGH-AVAILABILITY ENVIRONMENT

BACKGROUND

1. Field of the Invention

Embodiments of the present invention generally relate to high-quality and high-availability recording of a media stream, and, in particular, to a system and method for producing an archival copy of improved quality.

2. Description of Related Art

Call recording software applications are used for compliance recording purposes where there is usually a mandatory legal requirement to record all telephone calls for a long period of time (e.g., for seven years). In many of these configurations, a high availability ("HA") solution is usually also required in order to ensure that call recording will continue to function without interruption even if a recorder component fails. Typically in such HA solutions, there will be two recording servers that each have access to a media stream. Under normal operation, the primary server records the media stream. In case of failure, the secondary media stream takes over and records the media. The problem with this mode of operation is that during the transition between the two servers, some of the media may not be recorded and vital information may be lost. Other companies may utilize two active recording servers, resulting in duplication of information and inefficient utilization of storage space. In both of these scenarios, the recording of the call will usually experience some degradation in quality due to the network conditions and the associated path(s) that the audio and/or video calls must traverse in order to reach the call recorder(s).

Therefore, a need exists to provide improved high-quality and high-availability recording of a media stream that addresses the problems of the known art.

SUMMARY

In one embodiment, a method to improve quality of a high-availability recording of a media stream includes: recording the media stream by a first recorder at a first network location, to produce a first recording; recording the media stream by a second recorder at a second network location to produce a second recording, the second network location different than the first network location; comparing a quality metric of the first recording to a quality metric of the second recording; and creating an archival copy of the media stream based upon a comparison of quality metrics of the first recording and the second recording.

In some embodiments, the method may further include: segmenting the first recording into a first plurality of segments; segmenting the second recording into a second plurality of segments, wherein each segment of the second plurality of segments is substantially coextensive with a respective segment of the first plurality of segments; and for substantially each segment of the first plurality of segments: comparing a quality metric of said segment with a quality metric of a corresponding segment from the second plurality of segments; and creating an archival copy of a segment of the media stream based upon a comparison of quality metrics for said segment.

In one embodiment, a system to improve quality of a high-availability recording of a media stream includes: a first recorder configured to record the media stream at a first network location, to produce a first recording; a second recorder configured to record the media stream at a second network location to produce a second recording, the second network location different than the first network location; a comparator configured to compare a quality metric of the first recording to a quality metric of the second recording; and an archiver configured to archive a copy of the media stream based upon a comparison of quality metrics of the first recording and the second recording.

In some embodiments, the system may further include: a first segmenting module configured to segment the first recording into a first plurality of segments; a second segmenting module configured to segment the second recording into a second plurality of segments, wherein each segment of the second plurality of segments is substantially coextensive with a respective segment of the first plurality of segments; a comparator configured to compare a quality metric of substantially each segment of the first plurality of segments with a quality metric of a corresponding segment from the second plurality of segments; and an archiver configured to archive the media stream based upon a comparison of quality metrics for substantially each segment of the first plurality of segments.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings wherein like reference numerals in the various figures are utilized to designate like components, and wherein.

Figure 1:
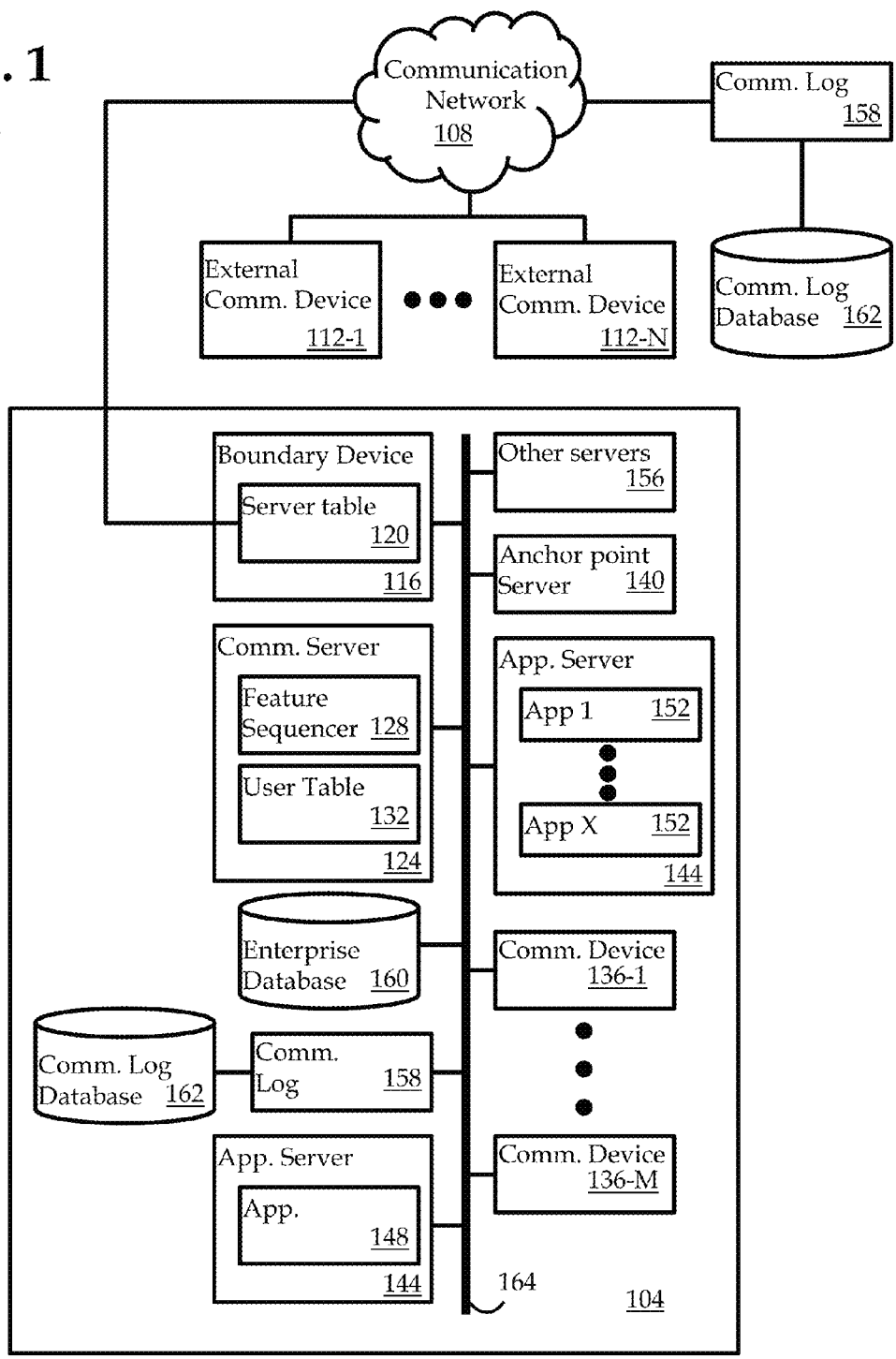
FIG. 1 is a block diagram depicting a system in accordance with an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the

DETAILED DESCRIPTION

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to utilize high-quality recording of a media stream, particularly in a high-availability environment.

The exemplary systems and methods of this disclosure will also be described in relation to software, modules, and associated hardware. However, to avoid unnecessarily obscuring the present disclosure, the following description omits well-known structures, components and devices that may be shown in block diagram form, are well known, or are otherwise summarized.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein in connection with embodiments of the present invention, the term "customer" denotes a party external to the contact center irrespective of whether or not that party is a "customer" in the sense of having a commercial relationship with the contact center or with a business represented by the contact center. "Customer" is thus shorthand, as used in contact center terminology, for the other party to a contact or a communications session.

The terms "switch," "server," "contact center server," or "contact center computer server" as used herein should be understood to include a Private Branch Exchange ("PBX"), an Automated Contact Distribution ("ACD") system, an enterprise switch, or other type of telecommunications system switch or server, as well as other types of processor-based communication control devices such as, but not limited to, media servers, computers, adjuncts, and the like.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, the term "gateway" may generally comprise any device that sends and receives data between devices. For example, a gateway may comprise routers, switches, bridges, firewalls, other network elements, and the like, any and combination thereof.

As used herein, the term "transmitter" may generally comprise any device, circuit, or apparatus capable of transmitting a signal. As used herein, the term "receiver" may generally comprise any device, circuit, or apparatus capable of receiving a signal. As used herein, the term "transceiver" may generally comprise any device, circuit, or apparatus capable of transmitting and receiving a signal. As used herein, the term "signal" may include one or more of an electrical signal, a radio signal, an optical signal, an acoustic signal, and so forth.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

One or more embodiments of the present invention may utilize Session Initiation Protocol (SIP) as a communication protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communication sessions. Examples of the types of communication sessions that may be established using SIP include voice or other audio, video, and/or instant messaging. SIP also facilitates peer-to-peer communication sessions. These communication sessions may be carried out on any type of communication device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

SIP is not a vertically integrated communications system. SIP is rather a component that can be used with other IETF protocols to build a complete multimedia architecture. SIP communication channels may carry real-time audio and/or video media streams that are communicated using a Real-time Transport Protocol ("RTP"), also known as RFC 3550 (formerly RFC 1889), for transporting real-time data and providing Quality of Service ("QoS") feedback.

Other protocols usable together with SIP may include the Real-Time streaming protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 2327) for describing multimedia sessions. Therefore, SIP should be used in conjunction with other protocols in order to provide complete services to the users. However, the basic functionality and operation of SIP does not depend on any of these protocols.

The Real-Time Transport Control Protocol ("RTCP") is a protocol that is known and described in Internet Engineering Task Force (IETF) Request For Comment RFC 3550. RTCP provides out-of-band statistics and control information for an RTP media stream. It is associated with RTP in the delivery and packaging of a media stream, but does not transport the media stream itself. Typically RTP will be sent on an even-numbered user datagram protocol ("UDP") port, with RTCP messages being sent over the next higher odd-numbered port. RTCP may be used to provide feedback on the quality of service ("QoS") in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control quality of service parameters, for instance by limiting a flow rate or by using a different codec.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices 112-1 . . . 112-N, where N is an integer, N≥1. The external communication device(s) 112 are generally referred to as "external" because they are either not under the direct control of the enterprise administering the enterprise network 104 or have a decreased level of trust with the enterprise network 104 as compared with communication devices 136-1 . . . 136-M (M an integer, M≥1) that are within the enterprise network 104. Exemplary types of external communication devices 112 include, without limitation, cellular phones, laptops, Personal Computers (PCs), Personal Digital Assistants (PDAs), digital phones, analog phones, and the like. External communication devices 112 may be configured to support one or more types of streaming media such as an audio media stream and/or a video media stream.

The communication network 108 may be packet-switched and/or circuit-switched. An exemplary communication network 108 includes, without limitation, a Wide Area Network (WAN), such as the Internet, a Public Switched Telephone Network (PSTN), a Plain Old Telephone Service (POTS) network, a cellular communications network, or combinations thereof. In one configuration, the communication network 108 is a public network supporting the TCP/IP suite of protocols.

The enterprise network 104 may include a boundary device 116 including a server table 120, a communication server 124 including a call feature sequencer 128 and a user table 132, one or more internal communication devices 136, an anchor point server 140, one or more application servers 144 which may be capable of providing one application 148 or a set of different applications 152, a number of other servers 156, and an enterprise database 160, all of which are interconnected by a (trusted or secure or private) Local Area Network (LAN) 164. Some or all of the functions depicted in FIG. 1 may be co-hosted and/or co-resident on a single server. The depiction of components in FIG. 1 is generally intended to be a logical depiction of the components of the system 100.

The LAN 164 can be secured from intrusion by untrusted parties by a gateway and/or firewall located between the LAN 164 and communication network 108. In some embodiments the boundary device 116 may include the functionality of the gateway and/or firewall. In some embodiments, a separate gateway or firewall may be provided between the boundary device 116 and the communication network 108.

The communications server 124 can include a Private Branch eXchange (PBX), an enterprise switch, an enterprise server, combinations thereof, or other type of telecommunications system switch or server. The communication server 124 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof. Embodiments herein may refer to communication server 124 generically as a "session manager" for ease of reference.

Although only a single communications server 124 is depicted in FIG. 1, two or more communications servers 124 may be provided in a single enterprise network 104 or across multiple separate LANs 164 owned and operated by a single enterprise, but separated by a communication network 108. In configurations where an enterprise or an enterprise network 104 includes two or more communications servers 124, each server 124 may comprise similar functionality, but may be provisioned for providing its features to only a subset of all enterprise users. In particular, a first communications server 124 may be authoritative for and services a first subset of enterprise users whereas a second communications server 124 may be authoritative for and services a second subset of enterprise users, where the first and second subsets of users generally do not share a common user. This is one reason why the network boundary device 116 may be provided with a server table 120.

Additionally, multiple servers 124 can support a common user community. For example, in geo-redundant configurations and other applications where users aren't necessarily bound to a single application server, there may be a cluster of equivalent servers where a user can be serviced by any server in the cluster.

In some embodiments, network boundary device 116 is responsible for initially routing communications within the enterprise network 104 to the communications server 124 responsible for servicing a particular user involved in the communication. For example, if a first enterprise user is being called by an external communication device 112, then the network boundary device 116 may initially receive the inbound call, determine that the call is directed toward the first enterprise user, reference the server table 120 to identify the authoritative communications server 124 for the first enterprise user, and route the inbound call to the authoritative communications server 124. Likewise, communications between internal enterprise users (e.g., internal communication devices 136) may first be serviced by the originating user's authoritative communications server 124 during the origination phase of communications set-up. After the origination phase is complete, the authoritative communications server 124 of the terminating (or called) user may be invoked to complete the termination phase of communications set-up. In some embodiments, the communications server 124 for the originating and terminating user may be the same, but it is not necessarily required that the server be the same. In situations where more than two enterprise users are involved in a communication session, authoritative communications servers 124 for each of the involved users may be employed without departing from the scope of the present invention. Additionally, the authoritative communications servers 124 for each user may be in the same enterprise network 104 or in different enterprise networks 104, which are owned by a common enterprise but are separated by the communication network 108.

Each communications server 124 includes a feature sequencer 128 and a user table 132. The user table 132 for a communications server 124 contains the communication preferences for each user for which it is authoritative. In particular, the user table 132 may be provisioned by users and/or by administrative personnel. The communications preferences for a particular user are referenced by the feature sequencer 128 to determine which, if any, features should be incorporated into a communication session for the user. The feature sequencer 128 may provide communication features directly into the communication session or the feature sequencer 128 can determine an application sequence which will be invoked during set-up and used during the communication session.

In accordance with at least some embodiments, the feature sequencer 128 can determine an application sequence and cause one or more applications 148, 152 to be sequenced into a communication session. In particular, the feature sequencer 128 is configured to analyze a particular user's communication preferences and invoke the necessary applications to fulfill such preferences. Once an application sequence is determined by the feature sequencer 128, the communications server 124 passes the communication-establishing message to a first application in the application sequence, thereby allowing the first application to determine the parameters of the communication session, insert itself into the control and/or media stream of the communication session, and thereby bind itself to the communication session. Once the first application has inserted itself into the communication session, the first application either passes the communication-establishing message back to the feature sequencer 128 to identify the next application in the application sequence or passes the communication-establishing message directly to a second application in the application sequence. Alternatively, or in addition, the message may be redirected, rejected, or the like. Moreover, parties and/or media servers may be added to the call by an application. As can be appreciated, the process continues until all applications have been included in the communication session and the process can be duplicated for each of the users involved in the communication session.

Although only two application servers 144 are depicted, one skilled in the art will appreciate the one, two, three, or more applications servers 144 can be provided and each server may be configured to provide one or more applications. The applications provided by a particular application server 144 may vary depending upon the capabilities of the server 144 and in the event that a particular application server 144 comprises a set of applications 152, one, some, or all of the applications in that set of applications 152 may be included in a particular application sequence. There is no requirement, however, that all applications in a set of applications 152 be included in an application sequence and there is no requirement as to the order in which applications are included in the application sequence. Rather, the application sequence is usually determined based on a user's communication preferences, which can be found in the user table 132. Alternatively, or in addition, the applications that appear in a users sequence vector and their order within that vector may be determined by a system administrator to satisfy business requirements.

Moreover, the application sequence can vary based on the media type(s) that are being used in the communication session. For instance, a user may have a first set of preferences for voice-based communications, a second set of preferences for video-based communications, and a third set of preferences for text-based communications. Additionally, a user may have preferences defining preferred media types and rules for converting communication sessions from one media type to another different media type. Still further, a user may have preferences defining the manner in which multi-media communications are established and conducted.

The applications included in a particular application sequence are generally included to accommodate the user's preferences. Applications may vary according to media-type, function, and the like. Exemplary types of applications include, without limitation, an EC-500 (extension to cellular) application, a call setup application, a voicemail application, an email application, a voice application, a video application, a text application, a conferencing application, a call recording application, a communication log service, a security application, an encryption application, a collaboration application, a whiteboard application, mobility applications, presence applications, media applications, messaging applications, bridging applications, and any other type of application that can supplement or enhance communications. Additionally, one, two, three, or more applications of a given type can be included in a single application sequence without departing from the scope of the present invention.

Embodiments in accordance with the present disclosure provide an ability by multiple recording systems to automatically create a newer variant or composite of a call recording file which is of a higher quality than any of the of the original recordings that were received. Embodiments expand the benefit of geo-redundancy High Availability ("HA") recording to provide a superior audio/video recording which cannot be attained by any one of the single recorders methods used in the industry today.

In a High Availability ("HA") recording system, "N" independent call recorders (e.g., a first call recorder and a second call recorder) may be deployed and configured to record the same incoming call, where N is a positive integer, N≥2. Such a configuration may be referred to as an "active-active" configuration because two independent call recorders are actively recording the same call. In the active-active configuration, a separate RTP stream is sent to each recorder. The recorders are usually deployed in different network locations, causing the RTP packet streams to take different network paths from the source to the respective recorder. Consequently, the RTP stream received by each recorder will vary relative to each other due to transmission effects such as packet loss, burst loss, jitter, etc. Furthermore, the transmission effects may vary over time as the quality of the transmission path changes, or if the transmission path itself changes by being routed over a different set of intermediate routers and hops. Hence each recorder is presented with a slightly different version of the same call, whose quality may change with respect to each other over time.

In the system of FIG. 1, a caller may be using one of external communication terminals 112 and a callee may be using one of communication devices 136. Such may be the situation when a retail customer external communication terminal 112 calls a broker at communication devices 136 and the call must be recorded. However, the configuration is not restricted in this regard, and both the caller and the callee may be using any respective one of external communication terminals 112 and/or communication devices 136. A server such as server 144 may be used to host an application that performs as a first call recorder. A second call recorder may be implemented as an application running on a server 144 in a separate enterprise network 104 that may be communicatively coupled to the first enterprise network 104 through communication network 108.

Figure 2:
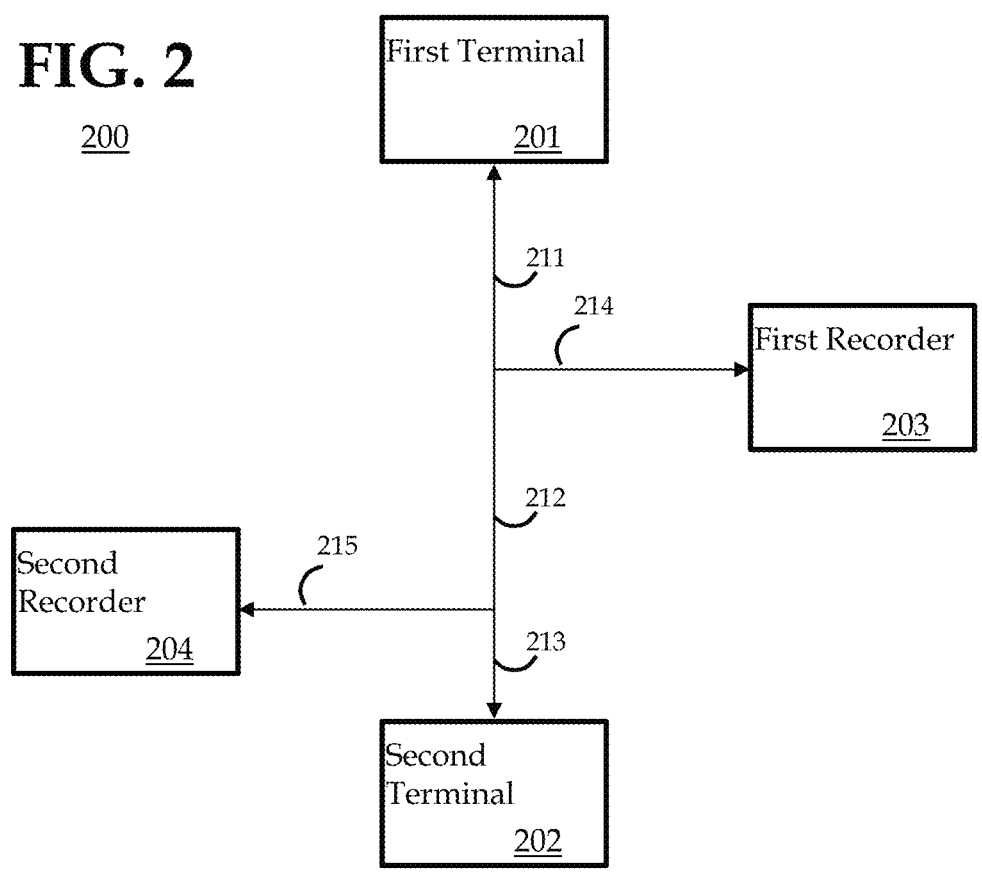
FIG. 2 illustrates at a high level of abstraction a system, in accordance with an embodiment of the present invention.

FIG. 2 illustrates at a high level of abstraction a system 200 to record an audio and/or video call between first terminal 201 and second terminal 202. Both first terminal 201 and second terminal 202 may be any one of external communication terminals 112 and communication devices 136. The call is being recorded by a first recorder 203 and a second recorder 204.

Streaming media may flow in both directions between first terminal 201 and second terminal 202. A transmission path from first terminal 201 to second terminal 202 at a connectivity level of abstraction may include path segments 211, 212 and 213, connected serially as shown in FIG. 2. A first end of path segment 211 is coupled to first terminal 201, and a second end of path segment 211 is connected to respective first ends of path segments 212 and 214. Second end of path segment 214 is coupled to first call recorder 203. Second end of path segment 212 is connected to respective first ends of path segments 213 and 215. Second end of path segment 215 is coupled to second call recorder 204. Second end of path segment 213 is coupled to second terminal 202.

A transmission path from second terminal 202 to first terminal 201 may also include path segments 211, 212 and 213 at a connectivity level of abstraction, but may include the same or different segments at a physical layer. Accordingly, a perceived level of quality may differ depending upon whether first terminal 201 is transmitting to second terminal 202, or if second terminal 202 is transmitting to first terminal 201.

For a media stream from first terminal 201 to second terminal 202, any transmission errors that occur only within segment 211 will affect the call as received by second terminal 202, will be recorded by first recorder 203, and will be recorded by second recorder 204. Any transmission errors that occur only within segment 212 will affect the call as received by second terminal 202, will not be recorded by first recorder 203, and will be recorded by second recorder 204. Any transmission errors that occur only within segment 213 will affect the call as received by second terminal 202, will not be recorded by first recorder 203, and will not be recorded by second recorder 204. Any transmission errors that occur only within segment 214 will not affect the call as received by second terminal 202, will be recorded by first recorder 203, and will not be recorded by second recorder 204. Any transmission errors that occur only within segment 215 will not affect the call as received by second terminal 202, will not be recorded by first recorder 203, and will be recorded by second recorder 204.

In some embodiments, first recorder 203 and/or second recorder 204 may be configured to record a separate media stream for each media stream sent by a caller or received by a callee. For example, first recorder 203 may be configured to make one recording for media streams originating from first terminal 201 and to make a second recording for media streams originating from second terminal 202. In some situations there may be multiple parties on the call (e.g., a conference call, or a call that is being monitored by a supervisor for training purposes). At recorders 201, 204, the number of recordings may be increased to include a separate recording for media streams sent by or received by each participant of the call. Such separate recordings may be combined or segments may be concatenated substantially as described herein.

In accordance with the present disclosure, when a recorder receives an incoming RTP steam, the recorder converts the RTP stream into a format that is suitable for storage. Concurrently, the recorder examines the RTP stream and additionally extracts metadata regarding the packet loss or other transmission effects associated with that particular call. The metadata may be used after the call in order to judge the transmission quality of the call. Both recorders perform this process for any calls that are being recorded in accordance with an embodiment of the present disclosure.

In some embodiments, the metadata may be recorded at fixed intervals (e.g., once per second). In some embodiments, the metadata may be recorded at non-fixed intervals of time, e.g., the recording of the metadata may be triggered by changes in the metadata, such as recording the metadata more frequently if the associated quality of service ("QoS") is relatively poor or is fluctuating at a relatively high rate.

Once the call is completed, metric information (e.g., metrics) in relation to the transmission quality of the call is compared. Each recorded file is analyzed in substantially the same way in order to derive a relative level of speech quality for the respective recording. The recorders will then negotiate which of the N files is the highest quality recording of the call, and only this version is retained and selected for archival purposes.

In some embodiments, the comparison takes place by the recorders exchanging metric information with each other. In some embodiments, the recorders may transmit their metric information to a separate entity that compares the metrics from all recorders. For example, the separate entity may include a comparator network element which itself is not used as a recorder but is able to communicate with the recorders and compare metrics from the recorders, and then save as an archival copy the highest-quality segment. In some embodiments, the metric information related to transmission quality may indicate an amount of packet loss that the respective recordings had experienced for the call, and may include one or more of the following: (1) a quantity of packets that had been lost or dropped; and/or (2) a number of contiguous packets that have been lost on each recording of the call (e.g., burst losses). Burst size that is considered to be a burst loss may be determined by a correction capability of the error-correction coding used. Metrics may be combined with equal or unequal weighting. For example, burst losses may be given a higher weighting since burst losses may have a more adverse effect on the quality of the call recording. Embodiments are not limited in this regard and may include different or additional metrics related to transmission quality as known to persons of skill in the art.

Figure 3:
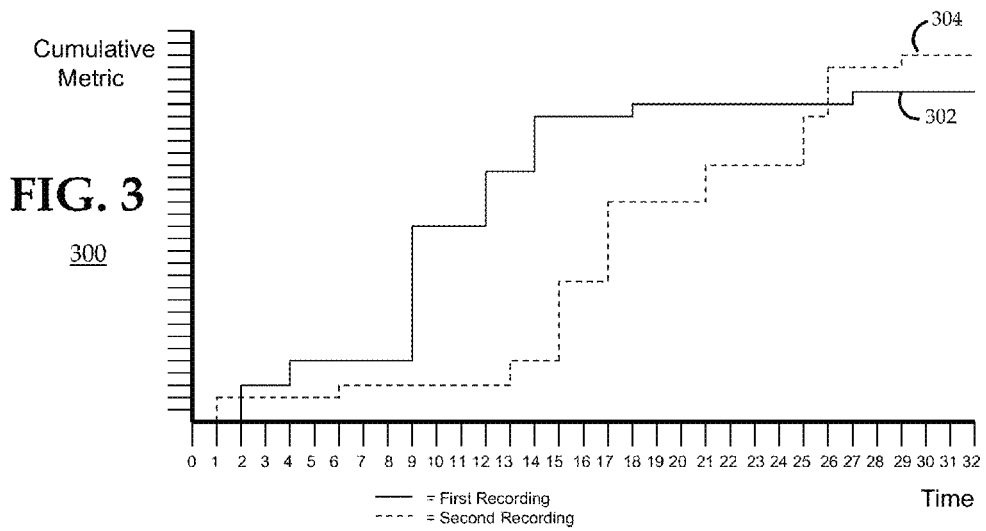
FIG. 3 illustrates exemplary quality metrics during the conduct of a call.

FIG. 3 illustrates an exemplary quality comparison 300 between two calls, in accordance with an embodiment of the present disclosure. Comparison 300 compares a metric of a first call recording 302 (solid line) with the metric for a second call recording 304 (dashed line). Additional curves may be provided for additional recorders, and additional graphs for additional metrics. Call recordings 302 and 304 are recordings of a single call as recorded by separate call recorders such as implemented on server 144. Comparison 300 illustrates a cumulative metric on the Y-axis and time on the X-axis. A higher value of the cumulative metric in comparison 300 represents a comparatively poorer quality. The cumulative metric may include, for example, a total number of dropped packets for the respective call, or a number of contiguous packets that have been lost during error bursts, and so forth. FIG. 3 is illustrated to show number of dropped packets as the metric.

Metrics of call recordings 302 and 304 as depicted in FIG. 3 span in Time ("T") from T=0 to T=32. The time scale illustrated here is arbitrary and may be longer, shorter, include more or fewer segments, or segments of unequal length. For example, the time scale of comparison 300 may represent one-second segments.

At certain times during each recording, the value of the cumulative metric may increase as instances of the monitored errors occur during the previous segment. For example, the cumulative metric associated with second call recording 304 increased at T=1 because some errors occurred during the segment of time 0<T≤1, and were reported at T=1. Similarly, the cumulative metric associated with call first recording 302 increased at T=2 because some errors occurred during the segment of time 1<T≤2, and were reported at T=2. For sake of clarity, each segment is depicted as including errors by at most one of the recordings. However, in general, any of the recordings may have errors in any of the segments.

At some points during the call recordings, a burst of errors may occur during at least some of the call recordings. For example, first call recording 302 experienced a burst of errors during 8<T≤9, and the burst caused a large jump in the metric to be reported at T=9.

At the end of the call in comparison 300 (i.e., at T=32), first call recording 302 finishes with a lower cumulative metric than second call recording 304, even though at various points during the call (e.g., T=11), first call recording 302 had a higher cumulative metric than second call recording 304. In some embodiments, an archival copy is selected from one of the entire recordings, e.g., all of first call recording 302 or all of second call recording 304. The recording to select as the archival copy may be selected based upon a comparison of metrics only at the end of the call. Applying such an embodiment to comparison 300, first call recording 302 would be selected as the archival copy because first call recording 302 had a lower cumulative metric at T=32 than second call recording 304.

Figure 4:
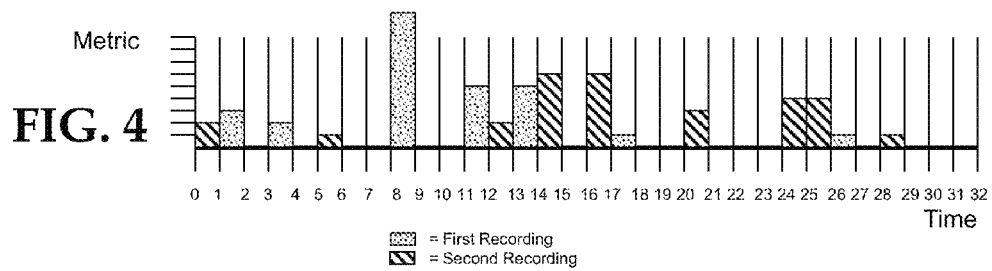
FIG. 4 illustrates a comparison of quality metrics during the conduct of a call.
Figure 5:
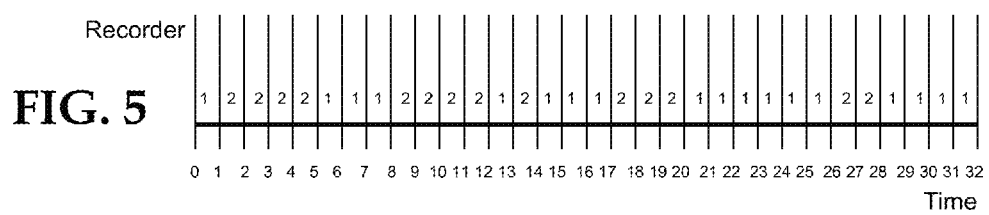
FIG. 5 illustrates selection of call recording sources during the conduct of a call.

In other embodiments, a process involves segmenting the N call recording files into suitably small segments, and analyzing each segment as to its degradation in quality. The total number of segments in a recording file may be referred to as "J", J a positive integer, and an individual segment in recording i (2≤i≤N) associated with recorder i may be referred to as $S_{ij}$ (j≤J). For a predetermined j, each $S_{ij}$ represents substantially the same portion of the call from the caller to callee. As illustrated in FIGS. 3-5, N=2 and J=32. The archival copy may be derived by selecting and concatenating, segment-by-segment, a segment from whichever of the N recordings had a highest quality during the respective segment of time. In some embodiments, the segments may be of substantially equal segments of time.

Embodiments may concatenate segments from different recorders in a different manner depending on the codec types used by the streaming media. For example, for a codec with high compression (e.g., G.729), a recorded segment may be converted to a linear (i.e., waveform) domain in order to create a composite file, and then the resultant composite file may be reconverted back to a final storage format (e.g., back to G.729).

Discontinuities when concatenating segments may introduce very high frequency components (i.e. "glitches") in the audio playback. Some embodiments may provide additional processing when creating a composite file, in order to avoid glitches when concatenating the substantially coextensive segments. The embodiments may align segments such that segments are concatenated at a zero-crossing point in order to avoid introducing a discontinuity in the waveform. Embodiments may further reduce discontinuities by concatenating at waveform points that substantially match both in level (e.g., at a zero crossing) and in slope (e.g., both rising or both falling).

For example, FIG. 4 illustrates values of the metric during each time segment from T=0 to T=32. A larger value for the metric during a time period indicates worse quality for the respective recording during that time segment. Metrics for first call recording 302 are indicated by a stipple pattern and metrics for second call recording 304 are indicated by a striped pattern. For sake of clarity, FIG. 4 illustrates a scenario in which there is no segment between T=0 and T=32 in which both first call recording 302 and second call recording 304 experience metrics (e.g., errors) during the same segment, but embodiments are not limited in this regard. FIG. 5 illustrates which recording is used in each segment of time when creating the archival copy. A "1" in a time segment indicates that the first recorder supplied the recording during the respective segment of time, and a "2" indicates that the second recorder supplied the recording during the respective segment of time.

As illustrated in FIG. 4, between T=0 and T=1 there were more errors in the second recording (i.e., two errors) than in the first recording (i.e., zero errors), so FIG. 5 indicates that the first recorder supplies the recording used between T=0 and T=1 for the archival copy. Between T=1 and T=2 there were more errors in the first recording (i.e., three errors) than in the second recording (i.e., zero errors), so FIG. 5 indicates that the second recorder supplies the recording used between T=1 and T=2 for the archival copy.

As illustrated in FIG. 4, between T=2 and T=3 there were no errors in either recording, so either recording can be used to provide the recording used between T=2 and T=3 for the archival copy. In some embodiments, when the recordings have equal quality during a segment $S_j$ (1≤j≤J), preference may be given to the recorder that provided the recording for segment $S_{j-1}$ for the archival recording. Therefore, the archival copy for segment $S_3$ uses the recording from the second call recording 304 because the second recording was used for the archival copy for segment $S_2$. In contrast, compare to the segment from T=6 to T=8, in which both the first call recording 302 and the second call recording 304 have no errors, but first call recording 302 supplies the recording for segments $S_7$ and $S_8$ because first call recording 302 supplied the recording for segment $S_6$ for the archival copy. This embodiment has an advantage of reducing the number of times that the source changes for the archival recording, and thus may reduce the number of artifacts (e.g., glitches) that may be introduced at segment boundaries when streaming media from different recordings are concatenated.

Embodiments in accordance with the present disclosure are not limited to audio recording. Embodiments may be adapted for use with video streams, in which a quality metric of the video file includes metrics usable with audio files and, additionally, metrics based on consideration of a specific video frame in which a packet loss has occurred.

Once this process is completed for each of the N files produced by the N recorders, a new composite file is created which uses only the highest quality segments that were found by the analysis during each subdivision. As a result, the composite file will be a better quality representation of the call when compared with any one of the original call recording files. The composite file is retained for archival purposes as an archival file, and the N files from which it was created are deleted from the system.

In accordance with another embodiment, the metadata in each recorder keeps track of lost packets for audio and/or video streams. Embodiments may use this information to update (e.g., to patch) a recorded file in a first recorder, which may be missing a few packets, with packets that were received by a second recorder. The updated information from the second recorder is referred to as a patch. Delivery of a patch from the second recorder to the first recorder may be by a high-reliability protocol such as TCP/IP, in order to ensure that the patch is delivered reliably to the first recorder. A high-reliability channel is a communication channel that uses a high-reliability protocol.

The decision of which file on a specific recorder should be patched with packets from the other recorder may be made at the end of the recorded session based on metrics recorded by each recorder.

In other embodiments, the N recorders may exchange information in real time over a high-reliability channel (e.g., one using TCP/IP) and for each segment j (j≤J) determine which of the N recorders has a highest quality segment j. If a different recorder has a higher quality, a patch from the highest quality recording will be applied to the other N−1 recorders.

Figure 6:
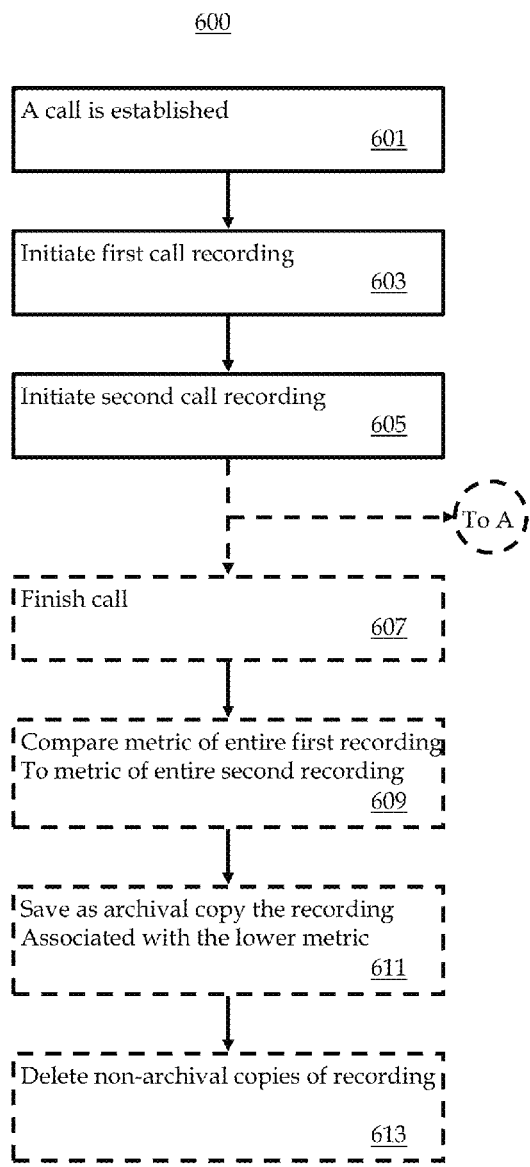
FIG. 6 illustrates a method to construct a high-quality archival recording of a call.

FIG. 6 illustrates process 600 in accordance with an embodiment of the present disclosure. Process 600 begins at step 601, at which a call or other streaming media is established, e.g., a caller calls a callee. The streaming media is referred to generically in FIG. 6 as a "call." The call may include audio and/or streaming media as discussed above.

Next, process 600 transfers to step 603 at which a first recording of the call is initiated and the quality of the first recording is monitored and metrics are recorded. The first recording will take place at a first predetermined location.

Next, process 600 transfers to step 605 at which at least a second recording of the call is initiated and the quality of the second recording is monitored and metrics are recorded. The second recording will take place at a second predetermined location. Generally, the second predetermined location will differ sufficiently from the first predetermined location such that a network path is significantly different, so that a transmission error may not affect network paths to both recorders at the same time. Additional recordings may be initiated at additional locations with attendant monitoring of the call quality and metrics recorded. The total number of recordings is N, N an integer such that N≥2.

Next, in one embodiment, process 600 may transition to step 607, at which the call ends. Next, at step 609, the call-end metrics associated with each of the N calls may be compared. In the example of a metric used herein (e.g., number of packets dropped), a lower value of the metric corresponds to a higher quality recording. However, alternative metrics may be envisioned in which a higher value of the metric corresponds to a higher quality recording.

Next, process 600 may transition to step 611, at which an archival copy of the call is saved as whichever of the N recordings had the higher cumulative quality at the end of the call (e.g., lower metric). Next, at step 613, nonarchival copies of the recording are deleted. Process 600 ends at the completion of step 613.

Figure 7:
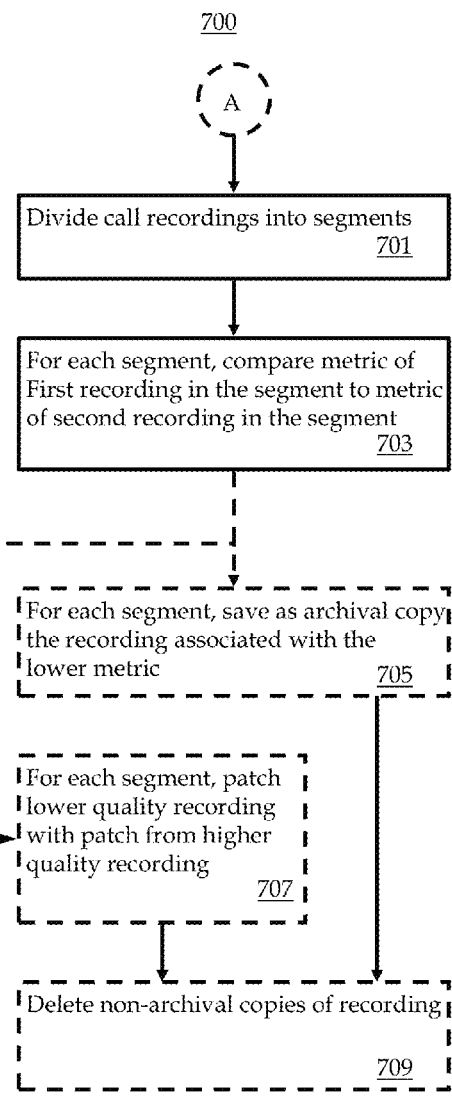
FIG. 7 illustrates another method to construct a high-quality archival recording of a call.

In other embodiments, after step 605 (if segmentation is performed on the fly during the call) or after step 607 (if segmentation is performed after the conclusion of the call), process 600 may transition to step 701 of FIG. 7. FIG. 7 illustrates process 700 in accordance with an embodiment of the present disclosure.

Process 700 begins at step 701, at which each of the call recordings is divided into segments. Step 701 may be performed at the conclusion of the call, or may be performed "on the fly" as the call is being recorded.

Next, control of process 700 transitions to step 703, at which for each segment of the call, a comparison is made for that segment of a metric of substantially each of the N recordings for that segment. Segmenting the call is inherently implied, and the segmentation may take place either during the progress of the call or after completion of the call. At the completion of step 703, process 700 may transition to either step 705 or step 707.

At step 705, for each segment, an archival copy of the recording of that segment is saved, the archival copy being associated with the recording having the higher quality in the segment. The saving may be performed by a processor that has access to the N recordings and selects on a segment-by-segment basis which recording to draw upon. Control of process 700 then transitions to step 709.

At step 707, for each segment, the lower quality recordings are patched with a patch from a higher quality recording. Control of process 700 then transitions to step 709.

At step 709, non-archival copies of the recording are deleted and process 700 ends.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

While the foregoing is directed to embodiments of the present invention, other and further embodiments of the present invention may be devised without departing from the basic scope thereof. It is understood that various embodiments described herein may be utilized in combination with any other embodiment described, without departing from the scope contained herein. Further, the foregoing description is not intended to be exhaustive or to limit the invention to the precise form disclosed. Modifications and variations are possible in light of the above teachings or may be acquired from practice of the invention. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A computer implemented method to improve quality of a high-availability recording of a media stream, comprising:
   recording the media stream by a first recorder executing on a first application server at a first network location, to produce a first recording;
   recording the media stream by a second recorder executing on a second application server at a second network location to produce a second recording, the second network location different than the first network location;
   segmenting the first recording into a first plurality of segments;
   segmenting the second recording into a second plurality of segments, wherein each segment of the first plurality of segments is substantially coextensive with a respective corresponding segment of the second plurality of segments thereby defining a plurality of segment pairs, wherein each segment pair comprises a) a respective first segment of the first plurality of segments and b) its respective corresponding segment of the second plurality of segments; and
   for each segment pair:
      comparing, by a processor coupled to a memory, a first quality metric value associated with the first segment with a second quality metric value associated with its respective corresponding segment; and
      selecting, by the processor, one of the first segment or its respective corresponding segment based on the compared first and second quality metric values; and
      forwarding, by the processor, the selected one of the first segment or its respective corresponding segment for each segment pair to a storage device for storing the selected one of the first segment or its respective corresponding segment in an archival copy of the media stream that is of a higher quality than either the first recording or the second recording.

2. The method of claim 1, further comprising, when the first quality metric is equal to the second quality metric for a current segment pair:
   determining, for an immediately previous segment pair, whether a source of the selected one segment was the first recording or the second recording; and
   selecting, for the current segment pair, the one of the first segment or its respective corresponding segment which is also from the determined source.

3. The method of claim 1, wherein:
   the first quality metric value comprises a first quantity of packets that had been lost or dropped from the first segment; and
   the second quality metric value comprises a second quantity of packets that had been lost or dropped from the respective corresponding segment.

4. The method of claim 1, wherein:
   the first quality metric value comprises a first quantity of contiguous packets that had been lost or dropped from the first segment; and
   the second quality metric value comprises a second quantity of contiguous packets that had been lost or dropped from the respective corresponding segment.

5. The method of claim 1, wherein:
   the first quality metric value comprises first metadata about the first recording recorded at fixed intervals; and
   the second quality metric value comprises second metadata about the second recording recorded at fixed intervals.

6. The method of claim 1, wherein:
   the first quality metric value comprises first metadata about the first recording recorded at non-fixed intervals of time; and
   the second quality metric value comprises second metadata about the second recording recorded at non-fixed intervals of time.

7. The method of claim 1, wherein the first application server comprises the processor coupled to the memory and comparing the first and second quality metric values comprises:
   receiving, by the first recorder, the second quality metric value from the second recorder; and
   when the second quality metric value indicates a higher quality than the first quality metric value:
      receiving by the first recorder a patch from the second recorder; and
      applying, by the first recorder, the patch to the first recording.

8. The method of claim 7, further comprising transmitting the patch from the second recorder to the first recorder via a high-reliability channel.

9. The method of claim 1, wherein comparing the first and second quality metric values comprises:
   receiving, by a comparator the first and second quality metric values for a predetermined time period; and
   determining, by the comparator, a highest quality metric value from the received quality metric values.

10. A system to improve quality of a high-availability recording of a media stream, comprising:
   a first application server at a first network location comprising:
      a first memory device storing first executable instructions; and
      a first processor in communication with the first memory device, wherein the first processor when executing the first executable instructions:
         records a first recording of the media stream; and
         segments the first recording into a first plurality of segments; and
   a second application server at a second network location different than the first network location, comprising:
      a second memory device storing second executable instructions; and
      a second processor in communication with the second memory device, wherein the second processor when executing the second executable instructions:
         records a second recording of the media stream; and
         segments the second recording into a second plurality of segments thereby defining a plurality of segment pairs, wherein each segment pair comprises a) a respective first segment of the first plurality of segments and b) its respective corresponding segment of the second plurality of segments;
   a third application server comprising:
      a third memory device storing third executable instructions; and
      a third processor in communication with the third memory device, wherein the third processor when executing the third executable instructions:
         for each segment pair:
            compares a first quality metric value associated with the first segment with a second quality metric value associated with its respective corresponding segment; and selects one of the first segment or its respective corresponding segment based on the compared first and second quality metric values; and forwards the selected one of the first segment or its respective corresponding segment for each segment pair to an archiver for storing the selected one of the first segment or its respective corresponding segment in an archival copy of the media stream that is of a higher quality than either the first recording or the second recording.

11. The system of claim 10, wherein when the first quality metric value is equal to the second quality metric value for a current segment pair, the third processor when executing the third executable instructions:

determines, for an immediately previous segment pair, whether a source of the selected one segment was the first recording or the second recording; and selects, for the current segment pair, the one of the first segment or its respective corresponding segment which is also from the determined source.

12. The system of claim 10, wherein:

the first quality metric value comprises a first quantity of packets that had been lost or dropped from the first segment; and the second quality metric value comprises a second quantity of packets that had been lost or dropped from the respective corresponding segment.

13. The system of claim 10, wherein:

the first quality metric value comprises a first quantity of contiguous packets that had been lost or dropped from the first segment; and the second quality metric value comprises a second quantity of contiguous packets that had been lost or dropped from the respective corresponding segment.

14. The system of claim 10, wherein:

the first quality metric value comprises first metadata about the first recording recorded at fixed intervals; and the second quality metric value comprises second metadata about the second recording recorded at fixed intervals.

15. The system of claim 10, wherein:

the first quality metric value comprises first metadata about the first recording recorded at non-fixed intervals of time; and the second quality metric value comprises second metadata about the second recording recorded at non-fixed intervals of time.

16. The method of claim 1, further comprising establishing real-time communication sessions by using a communication protocol, wherein the communication protocol comprises Session Initiation Protocol (SIP).

17. The system of claim 10, further comprising establishing real-time communication sessions by using a communication protocol, wherein the communication protocol comprises Session Initiation Protocol (SIP).

18. The system of claim 10, wherein the third application server and the first application server are the same server and the third processor and the first processor are the same processor.

19. The system of claim 18, wherein the third processor when executing the third executable instructions:

receives the second quality metric values from the second processor; and when the second quality metric value indicates a higher quality than the first quality metric value for a segment pair, the third processor when executing the third executable instructions:

receives a patch from the second processor; and applies the patch to the first recording.

20. The system of claim 19, further comprising a transmitter that transmits the patch from the second processor to the third processor via a high-reliability channel.

* * * * *